July 6, 1965 W. H. ELLIOT 3,193,710
INTRINSICALLY SAFE ELECTRICAL DEVICE CONTROL SYSTEMS
Filed Nov. 9, 1961 3 Sheets-Sheet 1
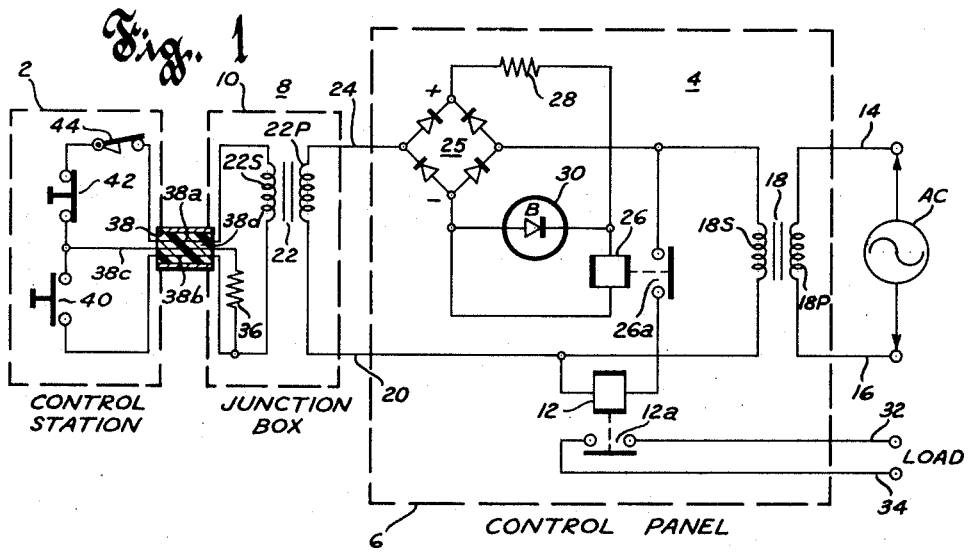
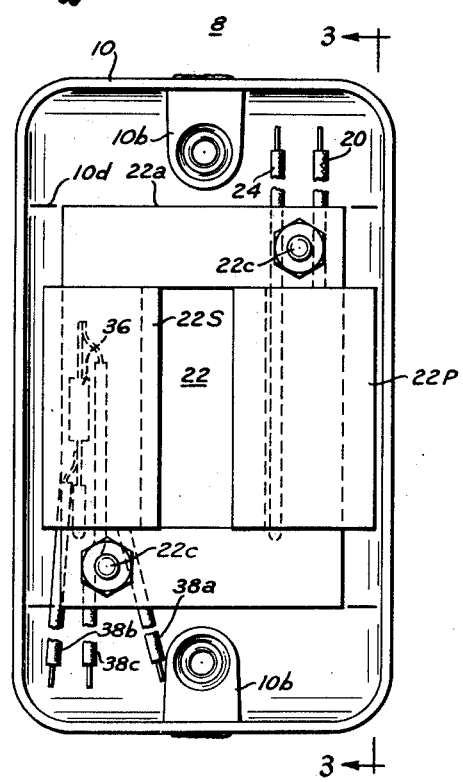
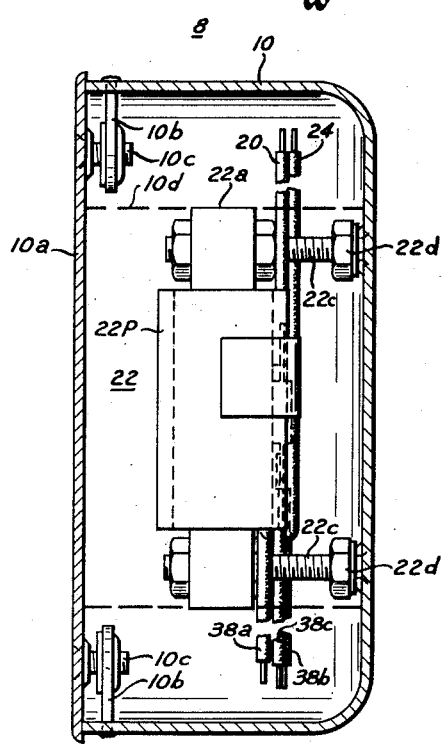

July 6, 1965 W. H. ELLIOT 3,193,710
INTRINSICALLY SAFE ELECTRICAL DEVICE CONTROL SYSTEMS
Filed Nov. 9, 1961 3 Sheets-Sheet 3

United States Patent Office 3,193,710
Patented July 6, 1965

3,193,710
INTRINSICALLY SAFE ELECTRICAL DEVICE CONTROL SYSTEMS
William H. Elliot, Milwaukee, Wis., assignor to Cutler-Hammer, Inc., Milwaukee, Wis., a corporation of Delaware
Filed Nov. 9, 1961, Ser. No. 151,306
7 Claims. (Cl. 307—136)

This invention relates to electrical device control systems and more particularly to intrinsically safe systems for controlling electromagnetic switches and the like.

While not limited thereto, the invention is especially applicable to safe control of operation of electroresponsive devices such as control relays from control stations in hazardous areas or locations, that is, locations wherein explosive gas or dust is present.

A general object of the invention is to provide improved electrical device control systems.

A more specific object of the invention is to provide intrinsically safe systems for controlling electroresponsive switches.

Another specific object of the invention is to provide improved means safely for controlling operation of electroresponsive relays from control stations located in hazardous areas wherein explosive gas or dust might be present.

Another specific object of the invention is to provide, in a system for controlling from a control station located in a hazardous area operation of electroresponsive relays located in a non-hazardous area, improved means for limiting the electrical power at such control station whereby the latter may be safely operated in the presence of explosive gas or dust.

Another object of the invention is to provide a system of the aforementioned type having circuit components which are adapted for embedding in potting material whereby to afford maximum distance, permanent separation between the electrical connections from the control station thereto and the electrical connections therefrom to the relay to be controlled and the electrical connections to the power supply source thereby to maintain the control station connections electrically isolated from the connections to the relay and power supply.

Another object of the invention is to provide in such system a rugged, tamper-proof sub-assembly which is shock resistant and substantially indestructible.

Other objects and advantages of the invention will hereinafter appear.

According to the invention, there are provided three modifications of an intrinsically safe relay control system. Each of these systems has a control station which may be located in a hazardous area wherein explosive gas or dust may be present. The values of voltage and current transmitted to the control stations are small to minimize electrical arcing or the like when the control switches are actuated, yet this small amount of control power is capable of controlling an electroresponsive device in a non-hazardous area. Each control station is connected to its associate relay control circuit by a sealed conduit to prevent creepage of gas thereto. The first modification is provided with a junction box having a potted saturating reactor to prevent transmission of dangerous amounts of voltage and current to the control station and to provide permanent separation between the electrical connections thereto. In the second and third modifications, the respective relay control circuits are potted to provide support for the components thereof and permanent electrical separation between the connections thereto. In each modification the conductors extend from the potted assembly at widely spaced locations to prevent accidental energy discharge therebetween. The second and third modifications are provided with saturating transformers effective on overvoltage to limit the power to the control station. The third modification has a relay control circuit constructed to afford maximum protection under any overvoltage condition.

The aforementioned and other objects and advantages of the invention and the manner of obtaining them will best be understood by reference to the following detailed description of embodiments of electrical device control systems taken in conjunction with the accompanying drawings, wherein:

FIGURE 1 diagrammatically shows a first embodiment of an intrinsically safe relay control system constructed in accordance with the invention;

FIG. 2 is a front elevation view of an enclosed junction device with the cover removed comprising mounting and assembly structure for the reactor and associated resistor of FIG. 1;

FIG. 3 is a cross sectional view taken along line 3—3 of FIG. 1 with the cover assembled;

Figure 4:
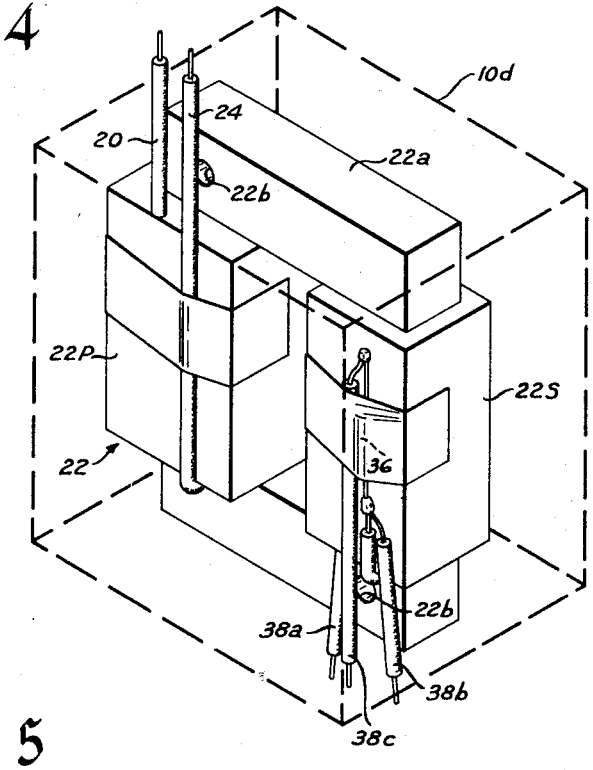
FIG. 4 is an isometric view of the reactor and resistor assembly of FIGS. 2 and 3.

Referring to FIG. 1, the system shown therein is provided with a switching control station 2 which may be located in a hazardous area wherein explosive gas or dust may be present. The system is also provided with a relay control circuit 4 mounted on a control panel 6 and a junction device or box 8 for electrically isolating the relay control circuit from the control station, the junction device having an enclosure 10. The control panel is located at a remote point removed from the hazardous area. The junction device is preferably also located at the remote point and is connected at one side to the relay control circuit. The other side of the junction device is provided with intrinsically safe connectors connecting the same to the control station as hereinafter more fully described.

Relay control circuit 4 which is arranged to operate a control relay 12 is provided with a pair of supply conductors 14 and 16 to which is connected a suitable source A.C. of alternating current power. The supply conductors are connected across a primary winding 18P of a voltage step-down, core-type power transformer 18. This transformer has the primary and secondary windings on different legs of the core spaced from one another to prevent short circuit therebetween. One end of secondary winding 18S of the power transformer is connected through a conductor 20, primary winding 22P of an electromagnetic reactor such as a transformer 22 and a conductor 24 in that order to one input terminal of a full-wave rectifying semi-conductor diode bridge 25, the other end of secondary winding 18S being connected to the other input terminal of the bridge. An operating coil of a sensitive pilot relay 26 is connected in series with a current limiting resistor 28 across the negative and positive output terminals of the bridge, that is, across the full-wave rectified supply, resistor 28 being connected to the positive terminal thereof. A voltage controlling or limiting diode 30 such as a semi-conductor diode of the breakdown type as indicated by B is connected across the operating coil of relay 26 for limiting or regulating the voltage across the coil. Diode 30 is poled so that its cathode is connected to the junction of resistor 28 and the pilot relay coil and the anode thereof is connected to the junction of the pilot relay coil and the negative output terminal of the bridge. Pilot relay 26 is provided with a normally open contact 26a connected in series with the operating coil of relay 12 across secondary winding 18S. Control relay 12 may be provided with suitable contacts for controlling one or more load devices. For illustrative purposes, control relay 12 is shown as having a normally open contact 12a connected to conductors 32 and 34 to which a desired electroresponsive load device may be connected.

Junction device 8 comprises the voltage step-down and voltage limiting transformer reactor 22 and a resistor 36. Primary winding 22P of the reactor is connected by the pair of conductors 20 and 24 to control circuit 4 mounted on control panel 6 as aforementioned. Secondary winding 22S of the reactor is connected through a pair of conductors 38a and 38b of a three-conductor hermetically sealed electrical conduit 38 to control station 2.

Control station 2 comprises a normally open start switch 40, a normally closed stop switch 42 and a normally closed limit switch 44 connected in series with one another preferably in that order and then through the aforementioned pair of conductors 38a and 38b of conduit 38 across secondary winding 22S. Resistor 36 in junction device 8 is a current-limiting, maintaining resistor and is connected through a third conductor 38c of conduit 38 across start switch 40. The start and stop switches may be of the manually operable pushbutton type or the like having spring means for returning the same to their normal positions shown. Limit switch 44 may be of the mechanically operated type and is preferably arranged for operation by a machine element or the like reaching a predetermined point of movement.

As shown in FIGS. 2 and 3, junction device 8 is provided with a rectangular enclosure 10 comprising an open front box of metallic material such as steel, or the like and having a cover 10a of like material arranged for closing the opening of the box. Enclosure 10 is provided with a pair of tabs 10b extending inwardly from the upper and lower walls thereof adjacent the opening. These tabs are provided with threaded holes therethrough for receiving the shanks of a pair of screws 10c which extend through a pair of registering apertures in cover 10a securely to assemble the cover over the enclosure opening whereby completely to enclose the reactor and resistor assembly therein.

As more clearly shown in FIG. 4, reactor 22 comprises a generally rectangular closed loop core 22a of magnetizable material such as laminated nickel-iron alloy. That is, core 22a is provided with upper and lower horizontal portions integrally joined at their associated ends by left-hand and right-hand vertical leg portions, respectively, to form a closed rectangular magnetic path. Primary winding 22P surrounds one leg portion and secondary winding 22S surrounds the other leg portion as shown in FIGS. 2 and 4. In this manner, the primary and secondary windings of the reactor are electrically isolated from one another whereby no currents flow therebetween and are magnetically coupled to one another through the core. As a result, the reactor electrically isolates the circuit of control station 2 from the control relay and power circuits in control circuit 4. Primary winding 22P is provided with many turns relative to secondary winding 22S and the core is constructed as aforesaid of predetermined size and cross-sectional dimension to afford a high ratio of the order of ten to one of the open-secondary-circuit primary impedance to the closed or shorted-secondary-circuit primary impedance. This impedance ratio in conjunction with the high sensitivity of pilot relay 26 affords a system wherein a very small amount of secondary power can be utilized reliably to control energization of an electrodynamic device such as control relay 12.

As shown in FIG. 4, the upper and lower portions of core 22a are each provided with a hole 22b therethrough for receiving the threaded shanks of suitable bolts 22c rigidly secured as by nuts 22d in holes in the rear wall of enclosure 10 shown in FIG. 3. Each bolt 22c is provided with an additional pair of nuts threaded thereon, one for spacing the reactor from the rear wall within the enclosure and the other for rigidly clamping the core between the nuts of such pair thereof as shown in FIGS. 2 and 3. As most clearly shown in FIGS. 2 and 4, primary winding 22P is connected to conductors 20 and 24 which may be connected to a conduit extending to the exterior of enclosure 10 through one or more suitable "knock-out" holes provided in the upper wall thereof. Secondary winding 22S is connected at one end to conductor 38a. The other end of the secondary winding is connected to conductor 38b and also through resistor 36 to conductor 38c. Conductors 38a, 38b and 38c may be connected to a conduit extending to the exterior of enclosure 10 through a similar "knock-out" hole provided in the lower wall thereof. Resistor 36 is mounted by suitably taping the same to the rear surface of the secondary winding as shown in FIGS. 3 and 4. Also, conductor 24 may be held to the rear surface of the primary winding by a piece of adhesive tape as shown in FIG. 4. The assembly including reactor 22 and resistor 36 when mounted in the enclosure is then wholly embedded in thermosetting material 10d or the like such as, for example, epoxy resin. The epoxy resin occupies the full height of the enclosure up to the open side thereof to prevent the conductors from one side being extended to the other side. Conduit 38 which connects control station 2 to junction device 8 is hermetically sealed or plugged with sealing material 38d so that explosive gases cannot seep from the control station through the conduit to the junction device. Also, the hermetically sealed conductors 38a–c are spaced a long distance from the primary conductors 20 and 24 on opposite sides of the junction device as shown in FIG. 4 to prevent discharge of electrical energy therebetween.

The operation of the system of FIG. 1 will now be described. Application of power from source A.C. to conductors 14 and 16 causes energization of the primary winding of transformer 18. Assuming that source A.C. has a voltage of 110 volts, transformer 18 decreases this voltage to substantially 28 volts which lower voltage appears across secondary winding 18S. This reduced voltage causes a small current to flow through conductor 20, primary winding 22P of the reactor, conductor 24, the left-hand input terminal and the positive output terminal of bridge 25, resistor 28, operating coil of relay 26 and the negative output terminal and the right-hand input terminal of bridge 25 to secondary winding 18S. On each alternate half-cycle, current flows from secondary winding 18S through the right-hand input terminal and the positive output terminal of bridge 25, resistor 28, coil of relay 26, the negative output terminal and the left-hand input terminal of bridge 25, conductor 24, reactor primary winding 22P and conductor 20 to the secondary winding of transformer 18. It will be apparent that in the aforesaid manner, alternating voltage is applied to primary winding 22P of the reactor and a unidirectional voltage, that is, a full-wave rectified voltage is applied from bridge 25 across the coil of relay 26 and resistor 28 in series. Due to the high impedance of primary winding 22P, the current flowing through the coil of relay 26 has a value insufficient to energize the relay.

Reactor 22 is of the voltage step-down type with a primary to secondary turns ratio of about four to one whereby applicatio of 28 volts to primary winding 22P induces a voltage of substantially 7 volts across secondary winding 22S. With start switch 40 open as shown in FIG. 1, secondary winding 22S is shunted by resistor 36 of relatively high resistance value. As a result, only a small magnetizing current will flow in the reactor primary winding circuit. This current, upon being rectified by bridge 25, is insufficient to operate relay 26.

To cause operation of relay 26, start switch 40 is momentarily pressed to close the same and to short-circuit secondary winding 22S through switches 42 and 44. Through normal transformer action in the reactor, this causes a large decrease in primary impedance to substantially one-tenth of its former value, thereby allowing almost unimpeded current flow in the reactor primary winding. The system affords a high ratio of primary current with switch 40 closed to primary current with switch 40 open. This increase in primary current is rectified by bridge 25 and applied to the coil of relay 26 to cause closure of its contact 26a. Contact 26a connects the coil of control relay 12 across secondary winding 18S of the power transformer to energize the control relay and to close its contact 12a. Contact 12a connects conductors 32 and 34 to control or energize the load. In effect, the system affords control of sensitive pilot relay 26 by changing the value of a very small current in the secondary winding of reactor 22.

When switch 40 is released to allow it to reopen, resistor 36 is connected across secondary winding 22S through switches 42 and 44. Insertion of resistor 36 in the reactor secondary circuit causes a decrease in the current flow therein. However, this reduced secondary current, while not sufficient to initiate operation of relay 26, is sufficient to maintain relay 26 energized and its contact 26a closed. That is, the reduced secondary current maintains the primary impedance low enough following initial saturation of the reactor core and maintains the primary current high enough to keep contact 26a closed. The inherent electromagnetic characteristics also contribute to maintaining relay 26 energized following reopening of switch 40. That is, when the armature gap of relay 26 is closed, the magnetic force maintaining it closed increases greatly with decrease in such armature gap so that relay 26 can be maintained operated with significantly reduced current flow in its operating coil.

Diode 30 is a breakdown type of voltage regulating diode which limits to approximately 12 volts the potential across the operating coil of relay 26 when the latter is operated. Diode 30 has sufficient slope in its breakdown characteristic to shunt current from the coil of relay 26 to effectively prevent operation of relay 26 in response to higher supply voltages when start switch 40 is not closed and yet will permit sufficient coil voltage for operation of relay 26 when the start switch is closed.

An important feature of the system shown in FIG. 1 is the core-type reactor 22 which isolates control station 2 from the relay control and power circuits on control panel 6. The reactor is provided with a rectangular core and the primary and secondary windings surround opposite legs thereof. In this manner, the primary and secondary windings are physically separated from one another and are further isolated and protected by being embedded in potting material in the junction box. The primary and secondary conductors extend from opposite ends of the junction box to maintain maximum separation therebetween.

The reactor is so constructed that should high voltage, that is, higher than normal voltage, inadvertently be applied to the primary winding, saturation of the core will limit the steady state secondary voltage to a maximum of approximately three times the normal secondary voltage. To this end, the core is constructed of nickel alloy steel to dimensions such that it will magnetically saturate at overvoltage. This special steel achieves a sharper saturation so that application of 220 or 440 volts inadvertently or due to some fault to the primary winding will not cause the secondary voltage to exceed about 22 volts R.M.S. steady state. As a result, the secondary voltage will always be limited to a small value, that is, only limited energy will be applied to the control station.

Mounting the reactor in its own junction box permits locating it at the point in any control enclosure, no matter how large, to which the control conductors from the control station at the hazardous location are extended. These control conductors are sealed as by embedding the same in conduit 38 to prevent any creepage of explosive gas through the conduit to junction box 10. The conductors from the junction box to the relay control panel may, therefore, be extended without conduit or special precaution because the reactor effectively limits the power level which can be transmitted therethrough to the control station.

When stop switch 42 is pressed or limit switch 44 is opened, secondary winding 22S is open-circuited to interrupt current flow therein. This causes the current flow to the coil of relay 26 to be decreased whereby to cause contact 26a to reopen. As a result, relay 12 is deenergized and contact 12a reopens the load circuit.

Figure 5:
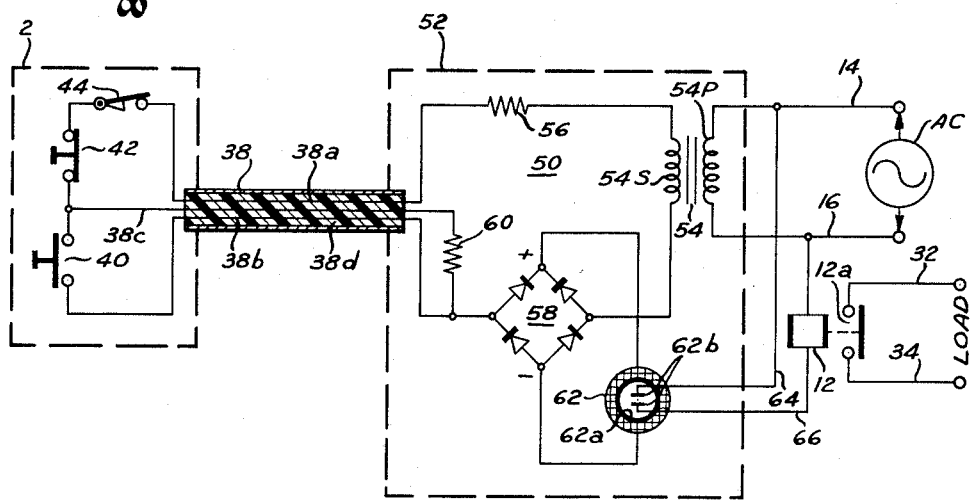
FIG. 5 is a diagrammatic illustration of a second embodiment of an intrinsically safe relay control system according to the invention.

In FIG. 5, reference characters like those in FIG. 1 have been employed for like parts. Referring to FIG. 5, the system shown therein is provided with a switching control station 2 having a start switch 40, a stop switch 42 and a limit switch 44 similar to the control station in FIG. 1. The system is also provided with a relay control circuit 50 constructed so that it can be embedded in potting material 52 represented by the broken lines, which potting material may be similar to that employed in junction box 10 of FIG. 1.

Relay control circuit 50 is arranged to operate control relay 12 having a contact 12a for controlling a load through conductors 32 and 34. Control circuit 50 is provided with a step-down power transformer 54 having its primary winding 54P connected through conductors 14 and 16 to source A.C. One end of secondary winding 54S is connected through a current limiting resistor 56 to conductor 38a of conduit 38. The other end of secondary winding 54S is connected to a first input terminal of a full-wave rectifying semi-conductor diode bridge 58, the other input terminal of the bridge being connected to conductor 38b. Such other input terminal of bridge 58 is also connected through a relatively high value resistor 60 to conductor 38c so that resistor 60 is connected across start switch 40 similar to the connection of resistor 36 in FIG. 1. Conduit 38 is like the conduit in FIG. 1 and is provided with sealing material 38d to prevent creepage of explosive gas therethrough. The operating coil of a reed switch 62 is connected across the positive and negative output terminals of bridge 58.

Figure 6:
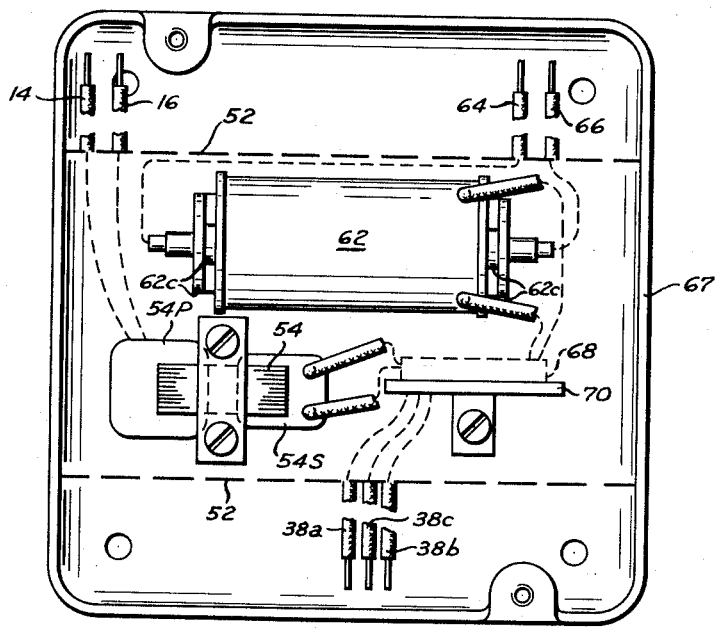
FIG. 6 is a front elevation view of mounting and assembly structure including an enclosing box with the cover removed of the right-hand broken-line-enclosed portion of the system of FIG. 5.

Reed switch 62 is provided with a sealed envelope 62a of glass or the like having a pair of contacts 62b extending from opposite ends into overlapping relation, with their inner contacting portions mechanically biased apart, whereby the contacts are normally open. Terminal portions integral with the respective contacts extend from opposite ends of the glass envelope as shown in FIG. 6 and are connected through conductors 64 and 66 in series with the operating coil of relay 12 across supply conductors 14 and 16. The operating coil of reed switch 62 surrounds the glass envelope so that, when energized, the contacts being of magnetizable material are attracted into engagement with one another at their overlapping inner ends to close the circuit and energize relay 12. The reed switch is provided with a partial magnetic path 62c shown in FIG. 6 to assist in maintaining the contacts closed when switch 40 reopens.

As shown in FIG. 6, transformer 54 and reed switch 62 are mounted in enclosure 67 by suitable mounting means shown therein. Resistors 56 and 60 and bridge 58 of FIG. 5 represented by the broken lines 68 in FIG. 6 are secured to a mounting board 70 which is mounted in the enclosure by suitable means shown therein. Transformer 54, reed switch 62 and mounting board 70 and the aforementioned components mounted thereon are embedded in potting material 52 shown by the broken lines in FIG. 6. As will be apparent, all of the circuit elements employed in this modification are of the type which are adapted for potting. Power supply conductors 14 and 16 extend through the upper left-hand corner, relay conductors 64 and 66 extend through the upper right-hand corner and safe conductors 38a, 38b and 38c extend through the lower central portion of enclosure 67 to the exterior thereof to afford maximum physical and electrical separation therebetween.

The operation of the system of FIG. 5 will now be described. Application of power from source A.C. to conductors 14 and 16 causes energization of the primary winding of transformer 54. Assuming that source A.C. has a voltage of 110 volts, transformer 54 decreases this voltage to substantially 22 volts which lower voltage appears across secondary winding 54S. This reduced voltage causes a small current to flow from the upper end of the secondary winding through resistor 56, conductor 38a, limit switch 44, stop switch 42, conductor 38c, resistor 60, the left-hand input terminal and the positive output terminal of bridge 58, the coil of reed switch 62 and the negative output terminal and the right-hand input of bridge 58 to the lower end of the secondary winding of the transformer. On each alternate half-cycle of the supply voltage, current flows from the lower end of secondary winding 54S through the right-hand input terminal and the positive output terminal of bridge 58, the coil of reed switch 62, the negative output terminal of bridge 58, resistor 60, conductor 38c stop switch 42, limit switch 44, conductor 38a and resistor 56 to the upper end of secondary winding 54S. Due to the combined resistances of resistors 56 and 60, this rectified current is of insufficient value to cause closure of contacts 62b.

Momentary pressing of start switch 40 to close the same and to short circuit resistor 60 leaves resistor 56 in circuit with bridge 58 and the coil of reed switch 62. Resistor 56 has a value of approximately 1,000 ohms whereby shunting of resistor 60 causes increase in the current flow to energize the coil of the reed switch sufficiently to close contact 62b. When switch 40 is released to allow it to reopen, resistor 60 is reinserted in the circuit. Resistor 60 has a resistance value of approximately 27 kilohms whereby the current to the reed switch coil is decreased. However, as it does not require as much current to maintain the reed switch closed after closure of the magnetic contact air gap thereof as it does to close the same in view of the partial magnetic path, this current is sufficient to maintain the reed switch closed. Contact 62b completes the energizing circuit for relay 12 to close contact 12a whereby to energize the load. Opening of stop switch 42 or limit switch 44 interrupts the circuit to the reed switch coil to deenergize the same and to open contact 62b. As a result, relay 12 at its contact 12a interrupts energization of the load.

It will be apparent from the foregoing that transformer 54 drops the supply voltage to about 22 volts and resistor 56 further limits the current which can flow through the control station 2 to a safe value. As a result, switches 40, 42 and 44 may be safely operated in a hazardous area without hazardous electrical arcing. Also, embedding the circuit components including transformer 54, resistors 56 and 60, bridge 58 and reed switch 62 in potting material further increases the safety of the system because such embedding effectively seals these components from the atmosphere. Moreover, separation of the conductors are aforementioned eliminates danger of electrical contact or arcing therebetween.

Figure 7:
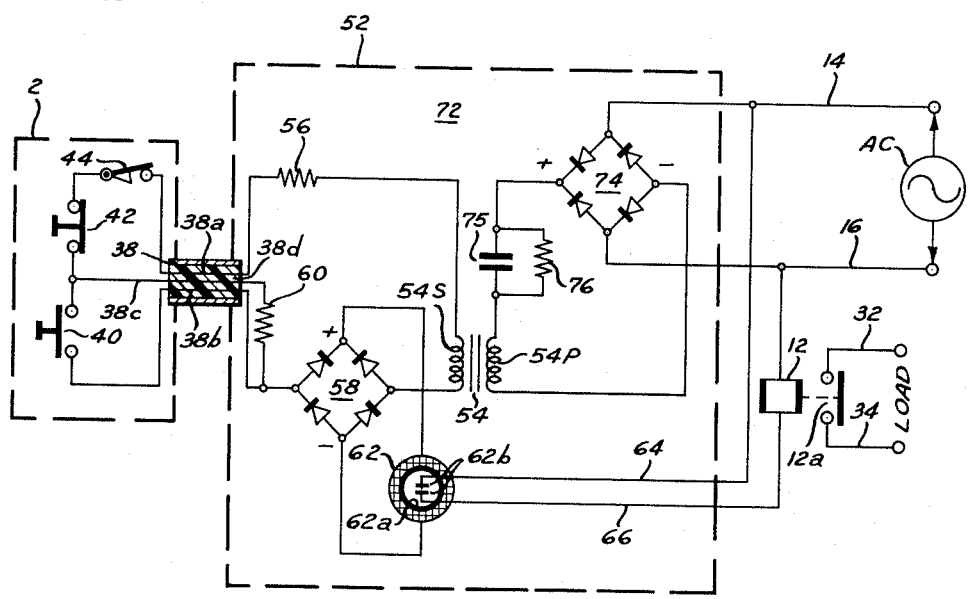
FIG. 7 is a diagrammatic illustration of a third embodiment of an intrinsically safe relay control system according to the invention.

In FIG. 7, reference characters like those in FIG. 5 have been used for like parts. Referring to FIG. 7, the modified system shown therein is provided with a switching control station 2 like that in FIG. 5 and having a start switch 40, a stop switch 42 and a limit switch 44. The system is also provided with a modified relay control circuit 72 constructed so that it can be embedded in potting material 52 represented by the broken lines, which potting may be similar to and employed for the same purpose as that in FIGS. 5 and 6. The relay control circuit is supplied with power from source A.C. through conductors 14 and 16, is connected to control station 2 through conductors 38a, 38b and 38c of sealed conduit 38 and is connected to the operating coil of relay 12 and the source through conductors 64 and 66 as in FIG. 5. Relay control circuit 72 also comprises transformer 54, resistors 56 and 60, rectifier bridge 58 and magnetic reed switch 62 similar to and connected to one another and to the conductors of conduit 38 in the same manner as the corresponding elements in FIG. 5.

Relay control circuit 72 further comprises a rectifier bridge 74 having its input terminals connected to supply conductors 14 and 16. The positive output terminal of bridge 74 is connected through a capacitor 75 and a resistor 76 in parallel and then through primary winding 54P of transformer 54 to the neagtive output terminal of bridge 74.

As will hereinafter be apparent, the circuit in FIG. 7 provides additional safety features to protect against any kind of supply overvoltages, even transient, which might otherwise increase the transformer secondary voltage to a hazardous level.

In the system of FIG. 7, supply voltage is applied from source A.C. through conductors 14 and 16 to the input terminals of bridge 74 to afford full-wave rectified voltage at the positive and negative output terminals of the bridge. Capacitor 75 is connected in series with transformer primary winding 54P to block or to prevent unidirectional voltage from being applied to the transformer primary winding. Otherwise, such unidirectional voltage if applied to the primary winding would magnetically saturate the transformer and interfere with transfer of power therethrough. The alternating ripple voltage of the full-wave rectified voltage is applied through capacitor 75 to the transformer primary winding. Resistor 76 of relatively high resistance value is connected across capacitor 75 to provide a discharge path for the capacitor. This resistor allows the capacitor to discharge periodically so that it will not maintain a charge at the peak voltage value. In this manner, the ripple voltage is applied to the transformer primary winding.

Transformer 54 is a core-type transformer having its primary winding 54P and secondary winding 54S wound on separate spaced legs of the core thereof to prevent any short circuit therebetween. Also, transformer 54 is constructed so that it will saturate on excess voltage for reasons hereinafter described.

When the switches at the control station are operated, the secondary voltage of transformer 54 will cause current flow to the operating coil of reed switch 62 to effect closure and opening of contact 62b in the same manner as described in connection with FIG. 5.

An important feature of the invention shown in FIG. 7 is its extremely safe characteristics. The peak reverse voltage of the diodes in bridge 74 is predetermined and selected so that it will be exceeded by a supply voltage of predetermined magnitude. If the supply voltage exceeds such magnitude, the peak reverse voltage will be exceeded causing diode breakdown and opening of the circuit. Such opening of the circuit positively prevents transmission of dangerous voltage magnitudes through the transformer to the control station in the hazardous area. Also, excessive supply voltage will drive the transformer into saturation and the resulting increase in transformer primary current will cause diode failure in bridge 74. The response will be extremely fast in either case preventing hazardous energy from being transmitted to the control station.

If any one diode in bridge 74 opens, the voltage on the primary winding of the transformer will be reduced because then it will be half-wave instead of full-wave. If any one diode shorts, it will cause failure of bridge 74 to open the circuit. If capacitor 75 opens, the voltage of transformer 54 will drop substantially due to the small current flow through high resistance 76. If capacitor 75 shorts, transformer 54 will saturate and the secondary voltage will decrease. If resistor 76 opens, capacitor 75 cannot discharge periodically and the transformer voltage will decrease. If resistor 56 shorts, the transformer will saturate and its voltage will drop. In the aforementioned manner, the system is fail-safe against component failures and will function instantly to prevent application of excess voltages through the transformer. While some of the protective features described heretofore result in component destruction, it will be apparent that the system can operate for considerable periods of time wherein the transformer alone by its saturation prevents transmission of dangerous voltages into the hazardous area.

While the invention hereinbefore described is effectively adapted to fulfill the objects stated, it is to be understood that I do not intend to confine my invention to the particular preferred embodiments of electrical device control systems disclosed, inasmuch as they are susceptible of various modifications without departing from the scope of the appended claims.

I claim:

1. A system for safely controlling from a control station located in a hazardous area where explosive gas or dust may be present an electromagnetic relay located in a non-hazardous area and allowing the use of economical switching means at the hazardous area comprising:
   general purpose switching means at the hazardous area of the type that is not sealed or provided with explosion proof enclosing means or the like;
   an alternating current power supply source at the non-hazardous area;
   a control circuit at the non-hazardous area;
   a hermetically sealed electrical conduit between the hazardous and non-hazardous areas for preventing seepage of explosive gas therebetween;
   conductor means extending through said sealed conduit connecting said control circuit to said general purpose switching means at the hazardous area;
   said control circuit comprising:
   a stepdown transformer supplied from said source for supplying a reduced amount of electrical potential to said control circuit;
   a sensitive electroresponsive device having an operating coil and self-enclosed contacts for controlling said electromagnetic relay;
   rectifier means for supplying unidirectional energy to the operating coil of said electroresponsive device;
   and a loop circuit having means comprising said rectifier means and said general purpose switching means and said conductor means supplied from the low potential side of said transformer for supplying a small and intrinsically safe amount of electrical energy through said general purpose switching means insufficient to ignite the gas thereat when said switching means is operated to cause energization of said operating coil to close said contacts when said general purpose switching means is closed.

2. The invention defined in claim 1, wherein said transformer is of the magnetic reactor type responsive to excessive supply voltage for limiting the electrical energy transmitted through said general purpose switching means to an intrinsically safe value.

3. The invention defined in claim 1, wherein said control circuit further comprises:
   a resistor connected through said conductor means across said general purpose switching means;
   and said resistor having a resistance value large enough to prevent operation of said electroresponsive device when said general purpose switching means is open but allowing sufficient current flow following momentary closure of said general purpose switching means to maintain said contacts closed.

4. The invention defined in claim 3, wherein said general purpose switching means comprises:
   a normally closed switch in series with said resistor and being operable for deenergizing the operating coil of said reed switch to open said contacts.

5. A system for safely controlling from a control station located in a hazardous area where explosive gas or dust may be present an electromagnetic relay located in a non-hazardous area and allowing the use of economical switching means at the hazardous area comprising:
   general purpose switching means at the hazardous area of the type that is not sealed or provided with explosion proof enclosing means or the like;
   an alternating current power supply source at the non-hazardous area;
   a control circuit at the non-hazardous area;
   a hermetically sealed electrical conduit between the hazardous and non-hazardous areas for preventing seepage of explosive gas therebetween;
   conductor means extending through said sealed conduit connecting said control circuit to said general purpose switching means at the hazardous area;
   and said control circuit comprising:
   a step-down transformer having its primary winding connected to said source;
   a full-wave rectifier bridge having a pair of input terminals and a pair of output terminals;
   a sensitive reed switch having an operating coil connected across the unidirectional current output terminals of said rectifier bridge and contacts for controlling operation of said electromagnetic relay;
   means comprising the input terminals of said rectifier bridge and said general purpose switching means connected in series through said conductor means across the secondary winding of said transformer, said series connection supplying an intrinsically safe amount of alternating energy to said general purpose switching means insufficient to ignite the gas thereat when said switching means is operated and supplying unidirectional energy through said rectifier means to said operating coil to close the reed switch contacts when said general purpose switching means is operated;
   and maintaining means connected through said conductor means across said general purpose switching means becoming effective when said general purpose switching means is momentarily closed to energize said operating coil for maintaining the reed switch contacts closed.

6. The invention defined in claim 5, wherein said maintaining means comprises:
   a resistor connected across said switching means;
   said resistor having a high resistance value whereby the current flow therethrough is insufficient to close the reed switch contacts;
   and momentary closure of said switching means across said resistor causing closure of said reed switch contacts and maintenance thereof closed by current flow through said resistor following reopening of said switching means.

7. In a system for safely controlling from a control station located in a hazardous area where explosive gas or dust may be present an electroresponsive load device located in a non-hazardous area:
   an unprotected switching control station at the hazardous area;
   a control circuit at the non-hazardous area for controlling the electroresponsive load device;
   means comprising a hermeticallly sealed electrical conduit connecting said control station to said control circuit;
   and an alternating current power supply source connected to said control circuit for supplying electrical energy thereto and therethrough to said control station;

said control circuit comprising a sensitive pilot relay for controlling said electroresponsive load device; rectifying means means connecting said source to said rectifying means for supplying unidirectional energy to said pilot relay and comprising:

impedance means in circuit with said source and said rectifying means for supplying a small amount of energy through said conduit and through said switching control station to said rectifying means;

and switching means at said control station for shunting a portion of said impedance means to control operation of said pilot relay.

References Cited by the Examiner

UNITED STATES PATENTS

| Re. 21,980 | 12/41 | Seeger et al. | 323—85 |
| 1,160,844 | 11/15 | Chernyshoff | 323—88 |
| 2,047,000 | 7/36 | Calvert | 174—18 |
| 3,065,399 | 11/62 | McNamee | 323—88 |

FOREIGN PATENTS 1,249,324  11/60  France.

LLOYD McCOLLUM, *Primary Examiner.*